United States Patent [19]
Sasaki

[11] Patent Number: 4,941,681
[45] Date of Patent: Jul. 17, 1990

[54] SLIDER AND ANCHOR LATCH DEVICE ASSEMBLY FOR PASSIVE SEAT BELT SYSTEM

[75] Inventor: Takanobu Sasaki, Yokohama, Japan

[73] Assignee: Nippon Seiko Kabushiki Kaisha, Tokyo, Japan

[21] Appl. No.: 313,633

[22] Filed: Feb. 22, 1989

[30] Foreign Application Priority Data

Feb. 24, 1988 [JP] Japan .................. 63-23606

[51] Int. Cl.⁵ .............................................. B60R 22/00
[52] U.S. Cl. .................................. 280/804; 280/808
[58] Field of Search ............... 280/804, 808, 801

[56] References Cited

U.S. PATENT DOCUMENTS

| | | | |
|---|---|---|---|
| 4,490,892 | 1/1985 | Ueda | 24/641 |
| 4,560,187 | 12/1985 | Yoshitsugu | 280/804 |
| 4,647,070 | 3/1987 | Yamamoto et al. | 280/804 |
| 4,738,470 | 4/1988 | Matsui et al. | 280/804 |
| 4,840,402 | 6/1989 | Yamamoto et al. | 280/804 |

Primary Examiner—Kenneth R. Rice
Attorney, Agent, or Firm—Wegner & Bretschneider

[57] ABSTRACT

An assembly of a slider and an anchor latch device is described. The assembly is suitable for use in a passive seat belt system of the type that a slider carries a webbing fastened thereto, is provided movably on and along a slide rail between an occupant-restraining position where the webbing may restrain an occupant and an occupant-releasing position where the webbing may release the occupant, and has a slider head received in the slide rail. The assembly includes an anchor base formed of a plate-like member and engageable with the slider when the slider is in the restraining position. Either the slider or anchor base is formed to maintain the slider and anchor base out of contact on the side of the slider head and on the side closest to the releasing position of an area of engagement between the slider and anchor base upon engagement thereof.

9 Claims, 4 Drawing Sheets

SLIDER AND ANCHOR LATCH DEVICE ASSEMBLY FOR PASSIVE SEAT BELT SYSTEM

BACKGROUND OF THE INVENTION (1) Field of the Invention:

This invention generally relates to a so-called passive seat belt system for protecting an occupant in the event of a vehicular emergency. More specifically, this invention is concerned with an assembly of a slider carrying a webbing fastened at one end thereof to the slider and being movable on and along a slide rail and an anchor latch device for holding the slider at an occupant-restraining position. In particular, this invention pertains to such a slider and anchor latch device assembly that the anchor latch device has strength and durability sufficient to withstand the considerable pulling force or tension which may be applied to the slider.

(2) Description of the Related Art:

A conventional passive seat belt system is illustrated by way of example in FIG. 11. A residual portion of an occupant-restraining webbing is wound into an inner retractor 200 provided on a lower side part of of a seat, while the free end of the webbing is fastened to a slider 40 via an emergency release buckle 50. The slider 40 is retained in a slide rail 30 mounted on a roofside area of the inner wall of the roof of a vehicle in such a way that the slider 40 can move back and forth along the longitudinal axis of the vehicle. The slider 40 is drawn along the slide rail by a drive member like a wire paid out or taken up by a drive unit 90 actuated by opening and closing the associated door. Internally the drive unit 90 has a reel connected to a motor, neither of which components is illustrated in the drawing. The drive member is wound on the reel, so that the drive member can be paid out or taken up.

An anchor latch device 85 is also provided at the rear end of the slide rail 30. Between the anchor latch device 85 and the drive unit 90, a guide tube 80 is arranged to guide the drive member therethrough.

Reference is now had to FIG. 12, which shows one example of conventional anchor latch devices employed in such passive seat belt systems.

A rear end portion of the slide rail 30, said end portion being located on a center pillar, is secured to the center pillar by bolts (not in illustration) via a bracket (also not shown). The rear end portion of the slide rail 30 is surrounded by a steel-made anchor base 20. The anchor base 20 is formed integrally with a mounting plate 26 (see FIG. 1). The mounting plate 26 is secured to the center pillar by bolts (not shown), so that the rear end portion of the slide rail 30 is also secured to the center pillar by way of the anchor base 20 and mounting plate 26.

The anchor latch device is now described in more detail. The anchor base 20 is pressed from high-strength sheet metal to press working. The anchor base 20 is formed to have a closed square shape in cross-section, so that it can surround the slide rail 30. A slider-receiving slot 28 is formed in a front wall 21 of the anchor base 20, said front wall 21 facing the emergency release buckle 50, so that the slot 28 downwardly terminates in an inner edge or end portion 22. When the slider 40 is driven downward, the inner edge portion 22 advances into an anchor-receiving slot 41 of the slider 40 so that the slider 40 is allowed to enter approximately to a longitudinal central portion of the anchor base 20.

On the other hand, the slider 40 defines an anchor-receiving slot 41 which allows the inner edge portion 22 of the front wall 21 of the anchor base 20, said front wall 21 facing the emergency release buckle 50, to advance into and engage the slider 40 when the slider 40 advances into the inside of the anchor base 20.

The anchor latch device operates in the following manner. When the passive seat belt system is in an occupant-restraining state, the anchor latch device maintains the anchor groove 41 of the slider 40 in engagement with the front wall 21 of the anchor base 20. Accordingly, the slider 40 is held in the anchor latch device.

Reference is now made to FIGS. 8-10. Assume that the passive seat belt system is in an occupant-restraining state and a vehicular emergency has occurred to exert a large tensile force to the webbing. In the anchor latch device of the passive seat belt system, the tensile force applied to the webbing is transmitted as a pulling force to the slider 40 and owing to the engagement between the anchor-receiving slot 41 of the slider 40 and the front wall 21 of the anchor base 20, the pulling force is borne by the front wall 21. Here, the line of action of the pulling force acting on the slider 40 is indicated by an arrow in FIG. 9. Since the line of action is not perpendicular to the plane of the front wall 21, the slider 40 is caused to tilt relative to the front wall 21 of the anchor base 20. As a result, a localized and concentrated load is applied to the inner edge portion 22 of front wall 21 of the anchor base 20. There is hence a potential danger that the thus-loaded part of the inner edge portion 22 may be torn up and the strength and durability of the anchor latch device may be reduced.

SUMMARY OF THE INVENTION

With the foregoing in view, the present invention has as a principal object the provision of an assembly of a slider and an anchor latch device, which is suitable for use in a passive seat belt system so that even when a vehicular emergency state has occurred and a large tensile force is applied to a webbing, the resulting large pulling force acted on the slider can be borne by the anchor latch device without failure and the strength and durability of the anchor latch device are not reduced.

In one aspect of this invention, there is thus provided an assembly of a slider and an anchor latch device, said assembly being suitable for use in a passive seat belt system of the type that a slider carries a webbing fastened thereto, is provided movably on and along a slide rail between an occupant-restraining position where the webbing may restrain an occupant and an occupant-releasing position where the webbing may release the occupant, and has a slider head received in the slide rail. The assembly comprises:

an anchor base formed of a plate-like member and engageable with the slider when the slider is in the restraining position; and a means for maintaining the slider and anchor base out of contact at a part of an area of engagement between the slider and anchor base upon engagement thereof, said part being on the side of the slider head and on the side closest to the releasing position.

In the slider and anchor latch device assembly according to this invention, the slider and anchor base is maintained out of contact at the part of the area of engagement between the slider and anchor base upon engagement thereof, said part being on the side of the slider head and on the side closest to the releasing position. It is therefore possible to avoid the application of a localized and concentrated load to that part even when a large tensile force is applied to the webbing and the slider is caused to tilt relative to the anchor base.

Even when a vehicular emergency state occurs and a large tensile force is applied to the webbing, the resulting large pulling force acted on the slider can be borne by the anchor latch device without failure. Moreover, the anchor base is free from a localized and concentrated load so that the anchor base is not torn up. The anchor latch device has therefore been improved in both strength and durability.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

The embodiments of this invention will hereinafter be described with reference to the accompanying drawings. Description of the overall structure of the passive seat belt system is omitted herein, because it is similar to the conventional art.

Figure 1:
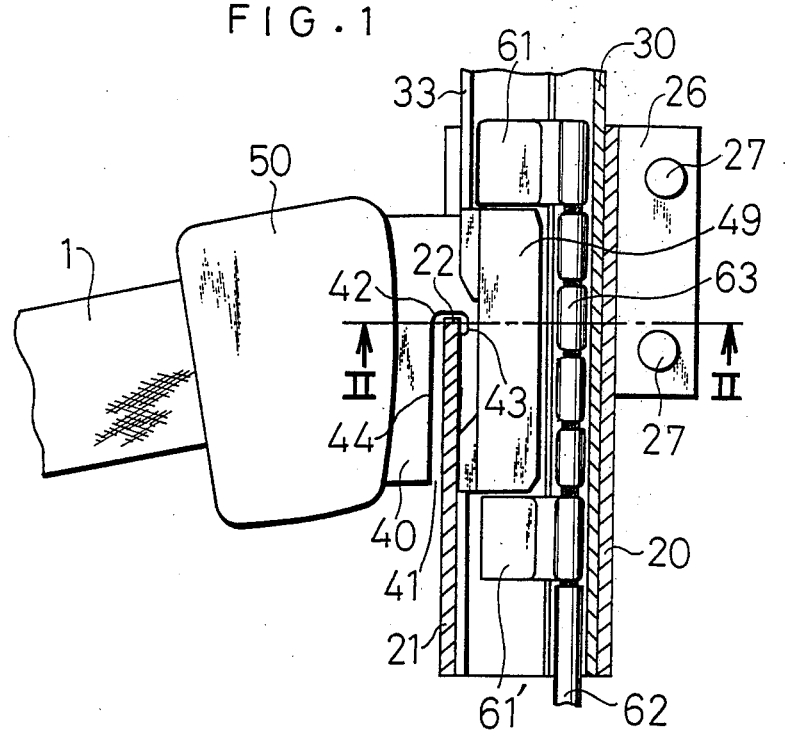
FIG. 1 is a schematic illustration of a slider and anchor latch device assembly according to a first embodiment of this invention.
Figure 2:
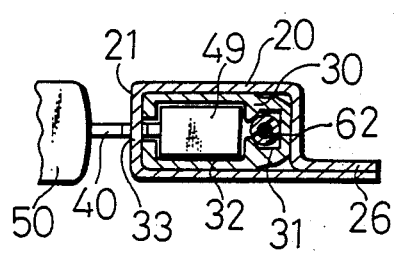
FIG. 2 is a transverse cross-section taken in the direction of arrows II—II of FIG. 1.
Figure 3:
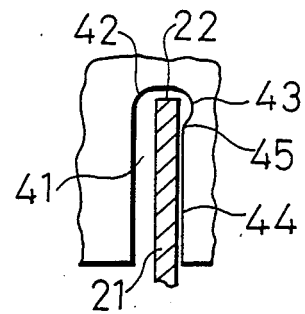
FIG. 3 is an enlarged fragmentary view of the first embodiment.

FIGS. 1 through 3 show the slider and anchor latch device assembly according to the first embodiment of this invention, which is suitable for use in a passive seat belt system.

In the drawings, the rear end portion of the slide rail 30, said end portion being located on the center pillar, is secured to the center pillar by bolts via a bracket (neither are shown). The anchor base 20 which surrounds the slide rail 30 is provided adjacent to the bracket. The anchor base 20 is positioned relative to the vehicle body and mounted to the vehicle body by bolts 27 or the like via the mounting plate 26.

The slide rail 30 internally defines a drive member channel 31 having a substantially circular cross-section and adapted to receive a drive member therein and a slider channel 32 having a substantially rectangular cross-section and adapted to receive slider head drive portions 61,61' therein An elongated slot is formed through a wall of the slide rail 30, said wall facing the emergency release buckle 50, namely, being on the lower side at a rail portion lying on the sideroof and on the front side at a rail portion resting on the center pillar, both, when mounted on the vehicle body.

The drive member is constructed of a wire 62, the paired slider head drive portions 61,61', and plural sleeves 63 provided side by side on the wire 62 between the paired slider head drive portions 61,61'. The slider head drive portions 61,61' are located on both sides of the slider head 49 respectively and are selectively brought into contact with the corresponding end walls of the slider head 49, whereby the slider head 49 is caused to move within and along the slide rail 30.

The anchor base 20 has been pressed from high-strength sheet metal. It has a square cross-section to facilitate sliding of the anchor base 20 along the slide rail 30 upon positioning it relative to the vehicle body. The slider-receiving slot 28 is formed as a preferable feature in the front wall 21 which faces the emergency release buckle 50, so that the slider 40 is allowed to advance approximately to a central part of the anchor base 20. The slider-receiving slot 28 inwardly terminates in the inner edge portion 22. Although the formation of such a slider-receiving slot is preferable to achieve surer retention of the slider 40, it should not be taken as an essential feature. As an alternative, the slider 40 may be supported on the upper edge of the anchor base 20.

On the other hand, the slider 40 defines the slider head 49 and anchor-receiving slot 41. The slider head 49 is brought into selective contact with either one of the paired slider head drive portions 61,61' of the drive member to receive a drive force from the selected slider head drive portion 61 or 61'. When the slider 40 advances into the anchor base 20, the anchor-receiving slot 41 allows the front wall 21 of the anchor base 20, said front wall 21 facing the emergency release buckle 50, to advance into and engage the slider 40.

A recess 43 is formed in one of the edges of the anchor-receiving slot 41, said edge being on the side of the slider head 49, at a location adjacent to an inner edge portion 42 defining the inner end of the anchor-receiving slot 41.

The operation of the first embodiment will next be described. Assume that an occupant is restrained by the webbing of the passive seat belt system. In the anchor latch device described above, the anchor-receiving slot 41 and the front wall 21 of the anchor base 20 are maintained in mutual engagement so that the slider 40 is held in place in the anchor latch device. Although omitted in the drawings, a stopper is additionally provided to stop the slider 40 at a predetermined position without failure. Because of this stopper, the inner edge portion 22 of the anchor base 20 and the inner edge portion 42 of the slider 40 are not in direct engagement while the slider 40 is held in place in the anchor latch device (see FIG. 3).

When an emergency state such as a vehicular collision occurs in the above state, an inertia force exerted on the occupant is transmitted to the webbing 1 to produce a large tensile force on the webbing 1. The tensile force then acts as a pulling force on the slider 40 by way of the buckle 50.

The pulling force applied to the slider 40 is thereafter transmitted to the front wall 21 of the anchor base 20 via the right-hand edge of the anchor-receiving slot 41 as viewed in FIG. 3, whereby the pulling force is borne by the front wall 21. Since the line of action of the pulling force acting on the slider 40 is not perpendicular to the plane of the front wall 21, the slider 40 is caused to tilt relative to the anchor base 20. Accordingly, the load would be concentrated on the inner edge portion 22 of the front wall 21 if the recess 43 were not formed.

However, the recess 43 is formed in one of the edges of the anchor groove 41 of the slider 40, said edge being on the side of the slider head 49, at a location adjacent the inner edge portion 42 in the first embodiment. A portion of the front wall 21, said portion being located adjacent the inner edge portion 22, is therefore brought into contact with a curved transition edge portion 45 which is located between a straight edge portion 44 of the anchor groove 41 and the recess 43. As a result, the load transfer area is therefore increased substantially and no localized and concentrated load thus does not act on the inner edge portion 22. Further, a force transmitted from the transition edge portion 45 is borne at a portion of the front wall 21, said portion is located somewhat downward from the inner edge portion 22 as viewed in FIG. 3, so that the the inner edge portion 22 is protected from damage.

Owing to the above construction, the large pulling force applied to the slider 40 can be borne by the anchor base 20 without failure. Moreover, the anchor base 20 is not torn up by a localized and concentrated load. The anchor base 20 has therefore been improved in strength and durability.

Figure 4:
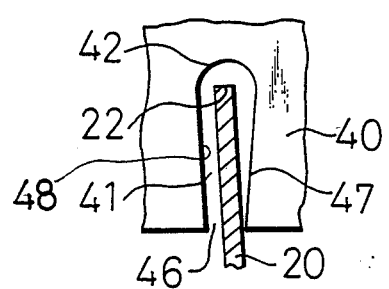
FIG. 4 is an enlarged fragmentary view of a slider and anchor latch device assembly according to a second embodiment of this invention.

The second embodiment of this invention will next be described with reference to FIG. 4. The anchor-receiving slot 41 of the slider 40 inwardly terminates in the inner edge portion 42. Both edges 47, 48 of the anchor-receiving slot 41 are formed in such a way that their distance becomes progressively wider toward the inner edge portion 42. The remaining structure is similar to the first embodiment and its description is hence omitted herein.

Owing to the inwardly and progressively widening distance between the edges 47 and 48 of the anchor-receiving slot 41, a portion of the edge 47, said portion being located adjacent the open end portion 46 of the anchor-receiving slot 41, is brought into contact with the front wall 21 of the anchor base 20 so that no localized and concentrated load acts on the inner edge portion 22.

It is therefore possible to bear the large pulling force, which has been applied to the slider 40, at the anchor base 20 without failure. Moreover, the anchor base 20 is not torn up by a localized and centralized load. The anchor base 20 has therefore been improved in both strength and durability.

Although the anchor-receiving slot 41 becomes progressively wider along both the edges 47,48 toward the inner edge portion 42 in the second embodiment, only the edge 47, which extends from the open end portion 46 of the anchor-receiving slot 41 to the inner edge portion 42 and is located on the side of the slider head 49 (see FIGS. 1 and 2), may be formed in such a way that the edge 47 becomes progressively apart from an imaginary longitudinal central axis of the anchor-receiving slot 41. This modified embodiment can bring about substantially the same effects as the second embodiment.

The third embodiment of this invention is now described with reference to FIG. 5. An indentation 23 has been pressed in the inner edge portion 22 of the anchor base 20 on the side of the slider head 49. The inner edge portion 22 is located opposite to the inneredge portion 42 which defines the closed inner end of the anchor-receiving slot 41. The remaining structure is similar to the first embodiment and its description is thus omitted herein.

Figure 5:
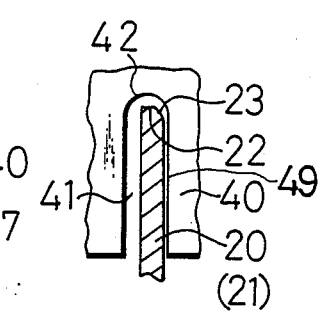
FIG. 5 is an enlarged fragmentary view of a slider and anchor latch device assembly according to a third embodiment of this invention.

Owing to the formation of the indentation 23, a right-hand edge 49, as viewed in FIG. 5, is not brought into engagement with the inner edge portion 22 of the anchor base 20 at an innermost edge portion located adjacent the inner edge portion 42. Instead, a portion of the anchor base 20, specifically, of the front wall 21, said portion being located inwardly of the inner edge portion 22 and extending inwardly further, engages the edge 49. As a result, the load transfer area is therefore increased substantially and no localized and concentrated load thus acts on the inner edge portion 22.

Owing to the above construction, a large pulling force applied to the slider 40 can be borne by the anchor base 20 without failure. Moreover, the anchor base 20 is not torn up by a localized and concentrated load. The anchor base 20 has therefore been improved in strength and durability.

Figure 6:
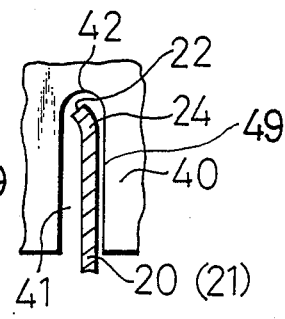
FIGS. 6 and 7 are enlarged fragmentary views of a slider and anchor latch device assembly according to a fourth embodiment of this invention.
Figure 7:
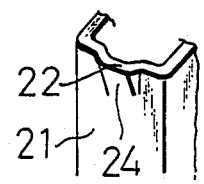
Figure 8:
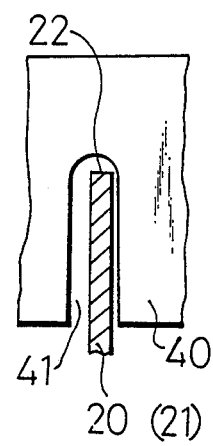
FIGS. 8 and 9 show the manner of tilting of a slider upon application of a pulling force to a slider in a conventional slider and anchor latch device assembly.
Figure 9:
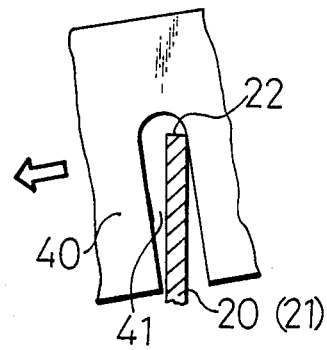
Figure 10:
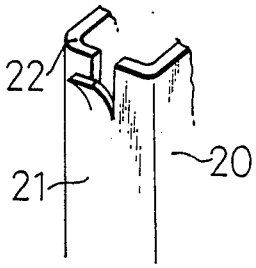
FIG. 10 is a perspective fragmentary view of an anchor base of the conventional assembly, in which the anchor base has been damaged.
Figure 11:
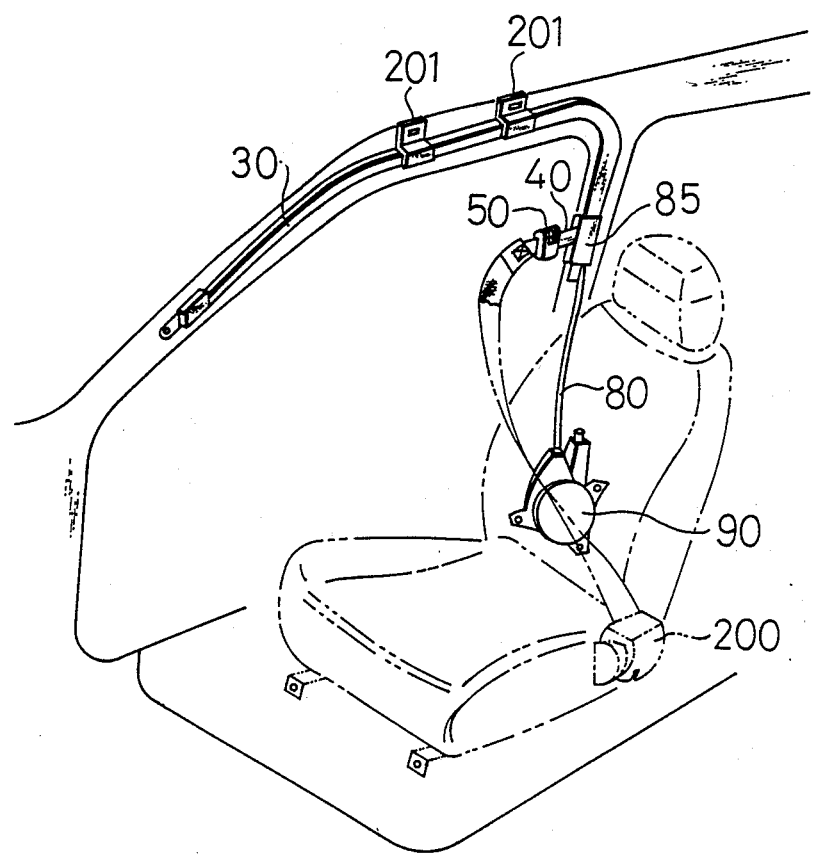
FIG. 11 is a schematic illustration of a passive seat belt system.
Figure 12:
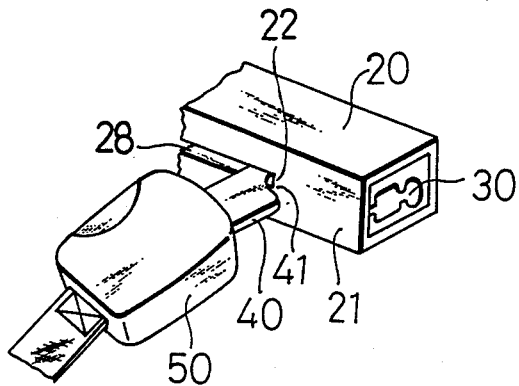
FIG. 12 shows an anchor latch device by way of example.

The forth embodiment of this invention will next be described with reference to FIGS. 6 and 7.

The inner edge portion 22 of the front wall 21 of the anchor base 20 has been drawn and bent toward the emergency release buckle 50 (see FIGS. 1 and 2), thereby forming an bent portion 24. The remaining structure is similar to the first embodiment and its description is thus omitted herein.

An innermost edge portion of the right-hand edge 49 of the anchor-receiving slot 41, said portion being adjacent to the inner edge portion 42 defining the closed end portion of the anchor-receiving slot 41, is not bought into engagement with the inner edge portion 22 of the front wall 21 of the anchor base 20, whereby no localized and concentrated load acts on the inner edge portion 22.

Owing to the above construction, a large pulling force applied to the slider 40 can be borne by the anchor base 20 without failure. Moreover, the anchor base 20 is not torn up by a localized and concentrated load. The anchor base 20 has therefore been improved in strength and durability.

I claim:

1. An assembly of a slider and an anchor latch device, said assembly being suitable for use in a passive seat belt system of the type that a slider carries a webbing fastened thereto, is provided movably on and along a slide rail between an occupant-restraining position where the webbing may restrain an occupant and an occupant-releasing position where the webbing may release the occupant, and has a slider head received in the slide rail, comprising:

an anchor base formed of a plate-like member and engageable with the slider when the slider is in the restraining position, said anchor base transversely surrounding the slide rails and having a front wall facing toward a webbing-fastened portion of the slider located in the occupant-restraining position and a pair of side walls extending from the front wall, said slider engaging with said front wall when the slider is in the occupant-restraining position; and a maintaining means for maintaining the slider and anchor base out of contact at a part of an area of engagement between the slider and anchor base upon engagement thereof, said part being on the side of the slider head and on the side closest to the releasing position.

2. The assembly as claimed in claim 1, wherein the slider defines a notch opening toward the side of the restraining position of the slider, an edge of the notch, said edge being on the side of the slider head, extends substantially in the direction of movement of the slider, and said maintaining means is a recess formed in the edge at a position in close proximity to an inner edge portion defining a closed end portion of the notch.

3. The assembly as claimed in claim 2, wherein the notch is a slot extending with substantially the same width.

4. The assembly as claimed in claim 1, wherein the slider defines a notch opening toward the side of the restraining position of the slider, and the maintaining means is formed by at least one edge of the notch, said at least one edge being on the side of the slider head and extending in such a direction that said at least one edge becomes progressively apart from an imaginary longitudinal central axis of the notch toward a closed end portion of the notch.

5. The assembly as claimed in claim 1, wherein the anchor base defines a slot for receiving the slider.

6. An assembly of a slider and an anchor latch device, said assembly being suitable for use in a passive seat belt system of the type that a slider carries a webbing fastened thereto, is provided movably on and along a slide rail between an occupant-restraining position where the webbing may restrain an occupant and an occupant-releasing position where the webbing may release the occupant, and has a slider head received in the slide rail, comprising:

an anchor base formed of a plate-like member and engageable with the slider when the slider is in the restraining position; and a maintaining means for maintaining the slider and anchor base out of contact at a part of an area of engagement between the slider and anchor base upon engagement thereof, said part being on the side of the slider head and on the side closest to the releasing position;

wherein the maintaining means is an indentation formed in the anchor base at an edge thereof, said edge being on the side of the releasing position.

7. The assembly as claimed in claim 6, wherein the indentation has been formed by drawing and bending at least a portion of the edge of the anchor base in a direction away from the slider head.

8. The assembly as claimed in claim 6, wherein the indentation has been formed by pressing.

9. An assembly of a slider and an anchor latch device, said assembly being suitable for use in a passive seat belt system of the type that a slider carries a webbing fastened thereto, is provided movably on and along a slide rail between an occupant-restraining position where the webbing may restrain an occupant and an occupant-releasing position where the webbing may release the occupant, and has a slider head received in the slide rail, comprising:

an anchor base formed of a plate-like member and engageable with the slider when the slider is in the restraining position; and a maintaining means for maintaining the slider and anchor base out of contact at a part of an area of engagement between the slider and anchor base upon engagement thereof, said part being on the side of the slider head and on the side closest to the releasing position;

wherein the slider defines a notch opening toward the side of the restraining position of the slider, an edge of the notch, said edge being on the side of the slider head, extends substantially in the direction of movement of the slider, and said maintaining means is a recess formed in the edge at a position in close proximity to an inner edge portion defining a closed end portion of the notch; and wherein the notch is a slot extending with substantially the same width.

* * * * *